United States Patent [19]

Silverman

[11] Patent Number: 4,591,363

[45] Date of Patent: May 27, 1986

[54] PROCESS OF MAKING A COATED ABRASIVE FOR DIAMOND GRINDING WHEELS

[76] Inventor: Warren J. Silverman, 2516 Ave. S, Brooklyn, N.Y. 11229

[21] Appl. No.: 761,003

[22] Filed: Jul. 31, 1985

[51] Int. Cl.$^4$ .............................................. E02D 27/00
[52] U.S. Cl. ......................................... 51/293; 51/295; 51/309
[58] Field of Search .......................... 51/293, 295, 309

[56] References Cited

U.S. PATENT DOCUMENTS

| | | | |
|---|---|---|---|
| 3,249,410 | 5/1966 | Lorenzo et al. | 51/293 |
| 3,503,725 | 3/1970 | Leipold | 51/293 |
| 3,929,432 | 12/1975 | Caveney | 51/295 |
| 3,957,461 | 5/1976 | Lindstrom et al. | 51/295 |
| 4,278,449 | 7/1981 | Helletsberger | 51/295 |
| 4,505,720 | 3/1985 | Gabor et al. | 51/309 |
| 4,526,875 | 7/1985 | Yamamoto et al. | 51/309 |

*Primary Examiner*—Paul Lieberman
*Assistant Examiner*—Willie J. Thompson
*Attorney, Agent, or Firm*—Hammond & Littell, Weissenberger & Dippert

[57] ABSTRACT

A process for making a coated abrasive for diamond grinding wheels in which a clean synthetic diamond grit is moistened with an aqueous wetting agent solution, a metal mixture consisting of about 70 percent deoxidized copper, about 20 percent tin and about 10 percent titanium hydride is added to the moistened diamond grit, a highly refractive and abrasive ceramic is added to the diamond-metal mixture, the resulting composition is sintered in a furnace with an inert atmosphere, the sintered composition is allowed to cool and is then comminuted by crushing.

3 Claims, No Drawings

PROCESS OF MAKING A COATED ABRASIVE FOR DIAMOND GRINDING WHEELS

This invention relates to a novel process for the manufacture of a coated synthetic diamond grit abrasive which is to be used for making diamond grinding wheels.

THE PRIOR ART

Coated synthetic diamond grit abrasives have been prepared by a variety of different methods, notably by the so-called electroless nickel process. However, the coated abrasives produced by these processes have not been entirely satisfactory in that they lose their grinding effectiveness relatively quickly, and diamond grinding wheels manufactured therewith have to be replaced too frequently.

OBJECTS OF THE INVENTION

It is an object of the present invention to provide a coated synthetic diamond grit abrasive for use in the manufacture of diamond grinding wheels, which retains its grinding effectiveness for a longer period of time than that of the prior art.

Another object is to provide a coated synthetic diamond grit abrasive which, when applied to diamond grinding wheels, imparts improved grinding properties and longer effectiveness to said wheels.

Other objects and advantages of the present invention will become apparent as the description thereof proceeds.

DESCRIPTION OF THE INVENTION

The above objects are achieved in accordance with the present invention by a process which comprises moistening clean synthetic diamond grit with an aqueous solution of a wetting agent, adding to the moistened diamond grit a metal mixture consisting of about 70 percent deoxidized copper, about 20 percent tin, and about 10 percent titanium hydride, zirconium hydride or hafnium hydride, preferably titanium hydride, in a ratio of up to about two parts metal mixture to one part diamond, preferably 1.72 parts metal mixture to one part diamond, adding about 10 percent by weight of a highly refractive and abrasive ceramic such as silicon carbide, tungsten carbide, titanium carbide or boron nitride, preferably silicon carbide, to the diamond-metal mixture, placing the resulting composition into a compartmented stainless steel tray, introducing the filled tray into a furnace with an inert atmosphere such as helium, argon or the like, and heating it at about 960° C. for several minutes to sinter its contents. After cooling to below 150° C. the tray is removed from the furnace, and the contents of the compartments are removed and crushed until all the material passes through a screen with a 2 to 4 times larger mesh than the original size of the diamond grit particles. Finally, the screened material is sieved on a screen with a mesh two sizes smaller than the original diamond grit to remove all the fines, and is washed to remove the most tenacious fines.

The following example illustrates the present invention and will enable others skilled in the art to understand it more completely. It should be understood, however, that the invention is not limited solely to the particular example given below.

EXAMPLE

The diamond grit to be coated was first degreased by immersion in a hot solution of aqueous potassium dichromate in sulfuric acid for approximately 30 minutes. After washing and drying, the degreased diamond grit was immersed in a hot solution of hydrofluoric and nitric acids (1:1) to remove any metals which may still have adhered to the surface. After at least 30 minutes in the solution, the diamond grit was washed and dried.

The clean diamond grit was then placed in a clean pyrex beaker. Best results were obtained when 75 grams of diamond were placed in a standard 2000 ml beaker. A separate container of cold water was prepared to which a few drops of a wetting agent such as Triton-X had been added. The coating alloy mixture was prepared by making up a mixture of 70 percent deoxidized copper, 20 percent tin, and 10 percent titanium hydride. All the chemicals had to be −325 mesh and made to pass through a 100 mesh screen to break up any clumps.

A synthetic bristle artist's brush of approximately ½" diameter was dipped in the wetting agent solution, and the clean diamond grit was stirred with the wet brush for about 10 seconds. The coating alloy mixture was then added to the beaker in a metal:diamond weight ratio of about 2:1, and the diamond-metal mixture was thoroughly mixed for 1 to 2 minutes. A silicon carbide powder (less than 10 micron size) was added to the diamond-metal mixture in an amount equal to 10 percent by weight of the diamond-metal mixture, and the mixture was stirred for about 1 minute. The resulting mixture was then dumped into a partitioned stainless steel tray for sintering. The tray was sprayed with a high-temperature mold release agent like graphite aerosol or molybdenum sulfide to prevent sticking. The tray contained stainless steel partitions so as to form a square grid with each box not more than ½" per side.

The tray was then put into a furnace with an inert gas atmosphere such as helium, brought up to 960° C. and kept there for 5 minutes. After cooling below 150° C. the tray was removed. The grid was then emptied by tapping out each box with a flat metal probe. The sintered bricks were forced through successively smaller screens to isolate the individual particles. A commercially available rock pulverizer was utilized for this step. The Rocklabs Laboratory Ring Grinder of New Zealand was very effective for this purpose. Only about five of the bricks at a time were put in the machine, and the running time was about 5 seconds. The number of screens the coated diamonds were forced through depended on their size. Crushing ceased when all material had passed through a screen with a mesh 2 to 4 sizes larger than the original size of the diamond grit particles. Examination with a stereoscopic microscope at each stage told when all the particles were separated. The material was then sieved on a screen 2 sizes smaller than the original diamond grit particles to remove all the fines. A final water wash removed the most tenacious of the fines.

The resulting coated synthetic diamond grit abrasive, when applied to the grinding surface of a grinding wheel, produced a grinding wheel with superior and long-lasting efficacy.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A process for the manufacture of a coated synthetic diamond grit abrasive for making diamond grinding wheels, which comprises moistening clean synthetic diamond grit with an aqueous wetting agent solution, adding to the moistened diamond grit a metal mixture consisting of about 70 percent deoxidized copper, about 20 percent tin and about 10 percent titanium hydride and about 10 percent of a metal hydride selected from the group consisting of titanium hydride, zirconium hydride and hafnium hydride in a ratio of up to about two parts metal mixture to one part diamond, adding to the resulting mixture about 10 percent by weight based on the weight of the diamond-metal mixture of a highly refractive and abrasive ceramic, filling the resulting composition into a compartmented stainless steel tray, heating the filled tray at about 960° C. in a furnace with an inert atmosphere to sinter said composition, cooling the sintered composition to below 150° C., crushing the cooled composition until the crushed material passes through a screen with a 2 to 4 times larger mesh than the original size of the diamond grit particles, and sieving the screened material on a screen with a mesh two sizes smaller than the original diamond grit.

2. The process of claim 1, wherein said highly refractive and abrasive ceramic is silicon carbide.

3. The process of claim 1, wherein the ratio of metal mixture to diamond is 1.72 parts metal mixture to 1 part diamond.

* * * * *